June 2, 1936.

A. JOSEPH 2,042,469

CATALYTIC APPARATUS AND PROCESS OF
REGENERATING CONTACT MASSES THEREIN

Original Filed March 31, 1930   4 Sheets-Sheet 1

INVENTOR
Alfred Joseph.
BY Cameron, Kerkam & Sutton
ATTORNEYS.

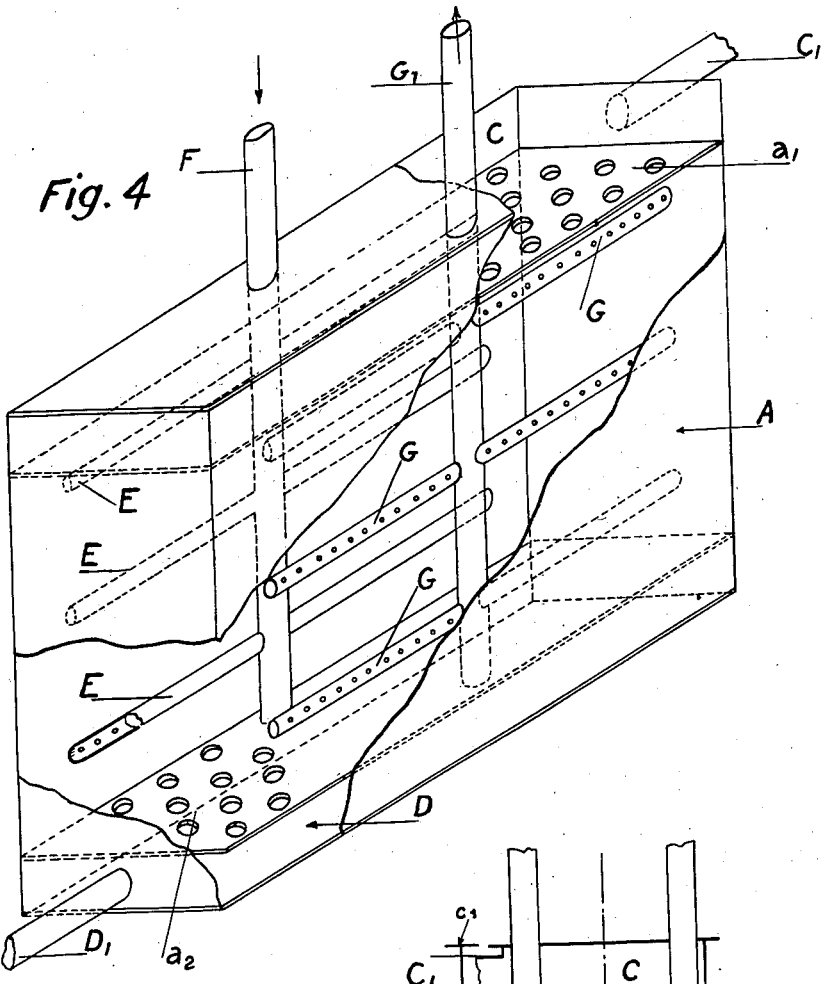
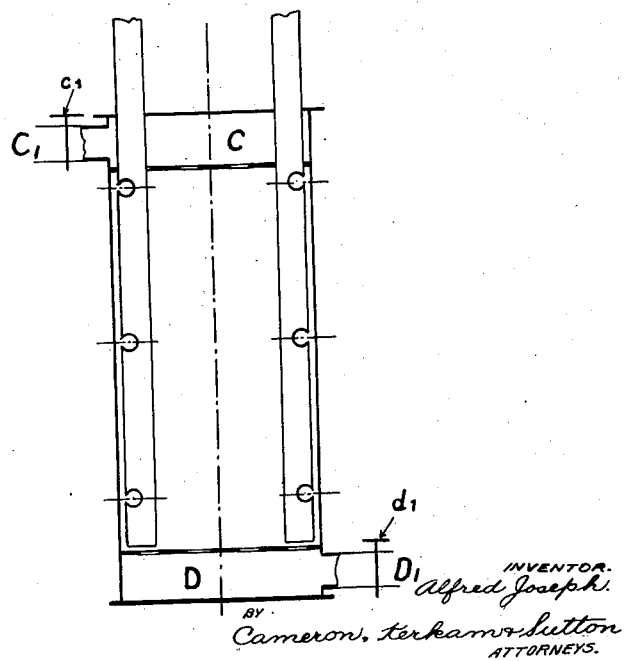
Fig. 4
Fig. 5

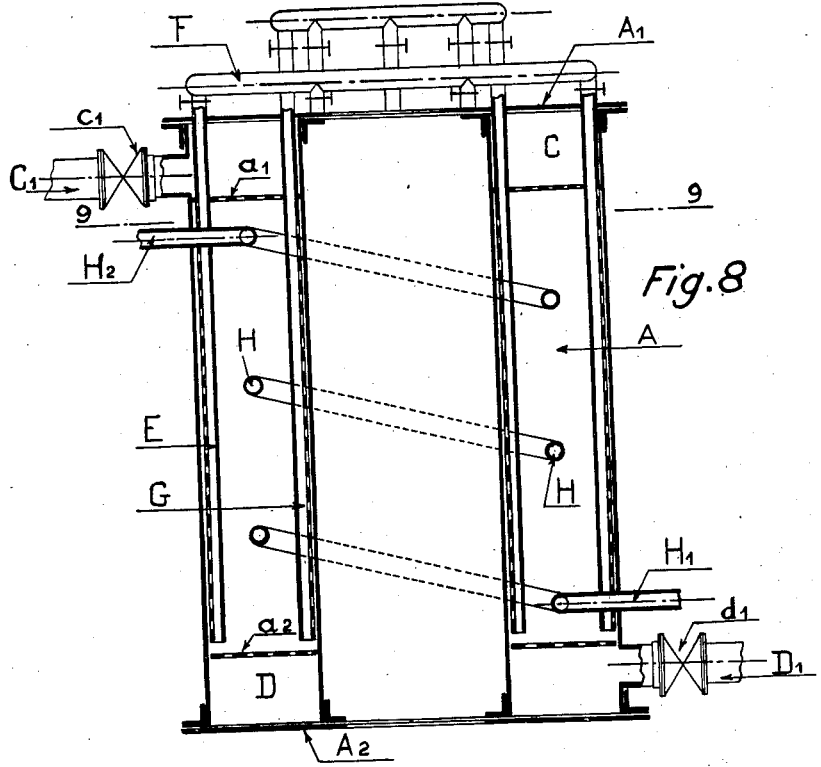
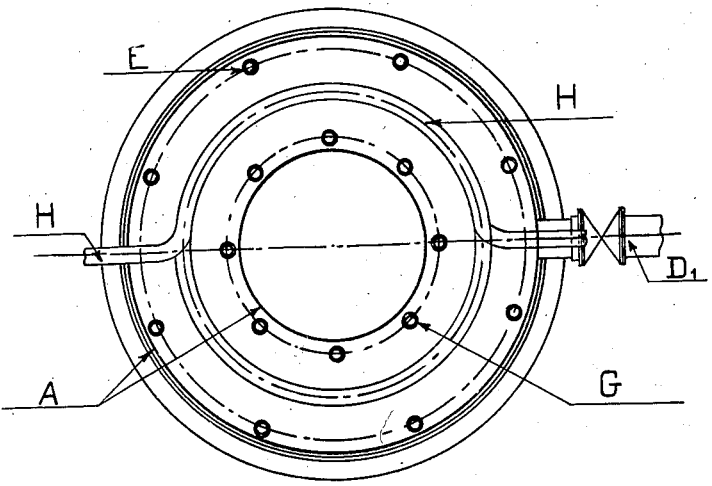

Patented June 2, 1936

2,042,469

UNITED STATES PATENT OFFICE 2,042,469

CATALYTIC APPARATUS AND PROCESS OF REGENERATING CONTACT MASSES THEREIN

Alfred Joseph, Paris, France, assignor, by mesne assignments, to Houdry Process Corporation, Dover, Del., a corporation of Delaware Application March 31, 1930, Serial No. 440,199½. Renewed March 2, 1934. In France August 2, 1929

25 Claims. (Cl. 23—288)

This invention relates to processes and apparatus for the treatment of materials, especially in gaseous or vaporous form, and for chemical reactions generally which are effected in the presence or by the aid of solid catalytic agents or contact masses, and for the reactivation or regeneration of such agents or masses which have become charged with deposits or contaminated by the treatment or reaction. In certain aspects it may be considered as an improvement on or further development of the invention disclosed in my copending application for Letters Patent of the United States, Serial No. 328,011, filed December 22, 1928, which issued as Patent No. 1,828,146 on October 20, 1931.

One object of the present invention is to improve the distribution of reactants, especially regenerating media, and the removal of reaction products in the interests of better control and more uniform operation and results. Another object is to send the reactants all through the contact mass in a series of parallel planes. Another object is to spread or disperse the reactant fluid before and after it enters the contact mass. Another object is to improve and shorten the regenerating cycle. Another object is to devise simple and efficient apparatus for realizing the above objects. Still further objects will be apparent from the detailed description which follows.

According to one form of the present invention, the gaseous regeneration agents are distributed within the catalytic or purifying agent by a series of roses enveloped by the agent with which the reaction or purification chamber is filled in a space comprised between two grids. The said roses, which may proceed from an external distribution trunk in common, are, preferably, located in the vicinity of the outer wall of the said chamber, the residual regeneration gases escaping by one or several similar roses connected to an exhaust passage or trunk, the outlet being thus capable of being effected in parallel with the regeneration at the levels of the exhaust rose or roses, at the same levels as the admission of the regenerating agent by the inlet roses.

Two forms of construction of the invention are illustrated, by way of example, in Figs. 1 to 3 of the accompanying drawings.

Figure 1:
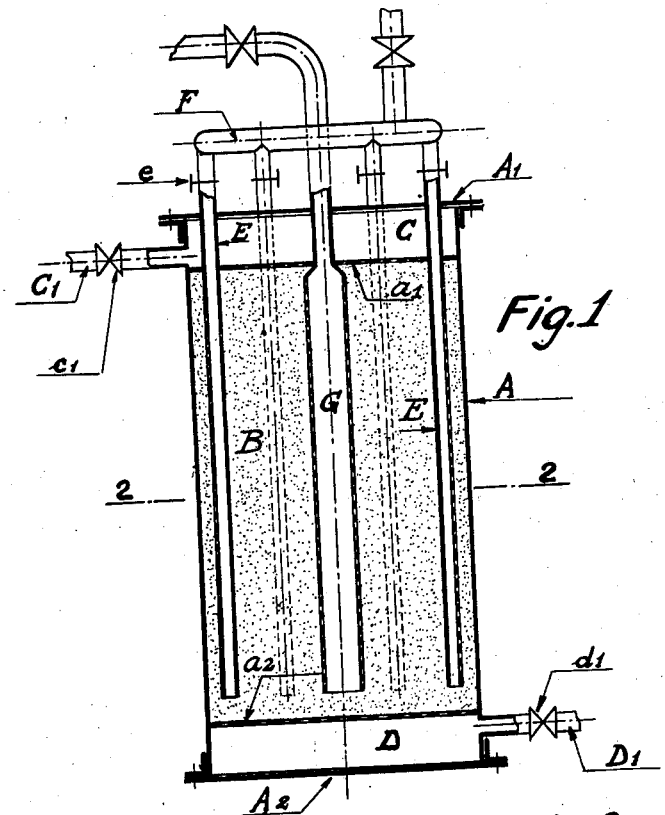
Fig. 1 is a longitudinal sectional elevation of a purifying apparatus or catalytic reaction chamber, for example for the treatment of mixtures of gases and vapours derived from the distillation or gasification of carbonaceous materials, such as lignites, shales, tars or from the vaporization of heavy oils, etc.
Figures 2, 3:
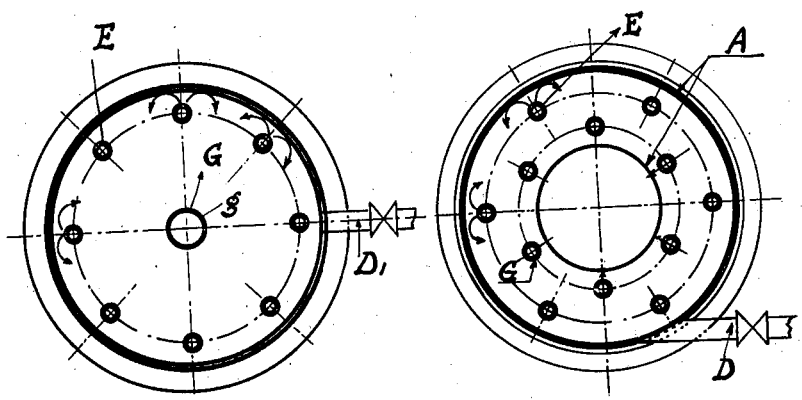
Fig. 2 is a corresponding sectional plan, along the line 2—2 of Fig. 1.
Fig. 3 is a similar sectional plan of a modification in which the reaction or purifying chamber is of annular structure.

In Figures 1 to 3: A is a catalytic reaction or purifying chamber, which is closed by a cover and base $A_1$, $A_2$ and charged with any suitable catalytic or purifying agent B, which may be metallic or oxi-metallic for example, and which is located between two grids $a_1$, $a_2$. In the intervening space between $A_1$ and $a_1$ is thus formed a chamber C for the admission of gases to be treated or purified, these being distributed by a pipe $C_1$ provided with a stop cock $c_1$. Between $a_2$ and $A_2$ is formed a chamber D for the outlet of the treated or purified gases which escape by a pipe $D_1$ provided with a stop cock $d_1$.

According to the invention, the gaseous regeneration agent (air with or without steam for example) is distributed by a series of roses E the axis of which is parallel with that of the chamber A and which may proceed from a distributing trunk F in common and each provided, outside the chamber A, with a cut-out cock $e$. These roses, closed at their lower ends have preferably only perforations directed towards the outer wall of the chamber A, as shown in Figs. 1 to 3. The said roses are moreover, preferably, uniformly spaced in the vicinity of the said outer wall in such manner that the gaseous regenerating agent is constrained to traverse the whole of the mass of the catalytic or purifying agent.

If a suitable number of roses relatively to the mass to be regenerated is selected and if such roses are suitably distributed, the regenerating agent will be distributed approximately simultaneously throughout the entire height of the apparatus.

According to the invention, the inlet roses E, thus arranged and distributed, are combined with one or several outlet roses G having orifices or perforations at approximately the same levels as those of the perforations of the inlet roses.

In the example given in Figs. 1 and 2, the reaction or purifying chamber A is of cylindrical form and it is assumed that a single axially extending outlet rose is employed, having orifices $g$ at the levels of the perforations of the inlet roses E. In the example given in Fig. 3, wherein the chamber A is of annular form, a nest of outlet roses is employed the elements G of which are preferably staggered relatively to the inlet roses E. These units obviously may lead into an outlet trunk in common outside the chamber A.

The gaseous or liquid regenerating agent admitted by the roses E, the cocks $c_1$ and $d_1$ being closed, penetrates into the catalytic or purifying mass to be regenerated throughout the entire height of the said roses E, in the direction of the arrows (Figs. 2 and 3) thus spreading in a uniform manner in each plane of the admission and at the various planes thereof throughout the entire height of the apparatus. The regenerating agent acts along a series of sections and the residual gas escapes at the same level, by the outlet rose or roses G. In this manner each unit mass of regenerating agent admitted into the apparatus acts upon a minimum quantity of catalytic or purifying agent and traverses in the apparatus the shortest possible path from its inlet into the mass to be regenerated to its issue from such mass. Theoretically, the regenerating agent follows a horizontal path corresponding to the distance from an inlet orifice of a rose E to an outlet orifice situated at the same level in a corresponding rose G. Not only is the regenerating agent thus utilized to the best advantage but its action being also distributed as perfectly as possible, the chances of a local superelevation of temperature are minimized. Finally, the duration of the operation being less, the apparatus can be more quickly readmitted into the reaction or purifying service.

All these results are obtained with an extremely simple form of construction capable of being very easily erected and eventually repaired.

In practice, it will be preferable to locate the roses E, as close as possible to the outer wall or envelope of the element A as is shown more accurately in Figs. 5, 8, and 9 than in Figs. 1 and 2, a relatively greater space being indicated between roses E and said wall in the latter two views than is actually employed in practice in order to preserve the clarity of the drawings. If the said roses are provided with orifices only facing such wall, the latter forms a deflector and there will in a manner of speaking be no catalytic or purifying material between the roses and the said wall. The presence of perforations in the side of the rose directed towards the axis of the apparatus would have the disadvantage of exposing the catalytic or purifying material, during regeneration or reactivation, to the direct action of a violent stream of air, which under certain circumstances might cause a dangerous superelevation of temperature in the zone adjacent to the roses.

The essential principles of the apparatus described above are to be seen in the employment of roses for the inlet of the regenerating agent and outlet of the regeneration gases, located in the vicinity of walls of very large surface of the receiver and having their orifices directed towards such walls, a corresponding outlet rose being provided for each inlet rose, in such manner that between corresponding roses, thus arranged, streams of regenerating agent traverse the entire mass of purifying or catalytic agent along one dimension of the apparatus. The roses are moreover distributed in a suitable number and uniformly along another dimension of the apparatus.

Figs. 4 to 7 illustrate a particularly practical modification of an apparatus in which precisely the same principles are applied.

Fig. 4 is a perspective view of the apparatus with portions broken away to show the internal arrangement.

Fig. 5 is a vertical transverse section.

The envelope in this construction has the form of a parallelepiped casing of relatively great length and great height but relatively small width. These casings are of infinitely easier and more economical construction than the envelopes of annular transverse section described above and illustrated in Figs. 1 to 3.

In the envelope A, the purifying material or catalytic agent is located between two grids $a_1$ and $a_2$ respectively, the upper grid $a_1$ being if desired suppressed.

The regenerating agent such as air or oxygen is admitted by a trunk F, located in the immediate vicinity of one of the vertical longitudinal walls of the casing and preferably in the middle transverse plane.

From this trunk extend, in the form of horizontal branches suitably distributed throughout the whole height of the purifying or catalytic mass, roses E the orifices of which are located facing the corresponding wall, a very slight interval being retained between the said orifices and the wall.

The regenerating agent thus spreads uniformly within the mass to be regenerated, the regeneration gases finding outlets, for their escape, in corresponding parallel roses G, two roses G extending from an outlet trunk $G_1$ in common corresponding to each two roses E situated in the same horizontal plane or in a plane suitably offset relatively to that of the inlet roses.

Figure 6:
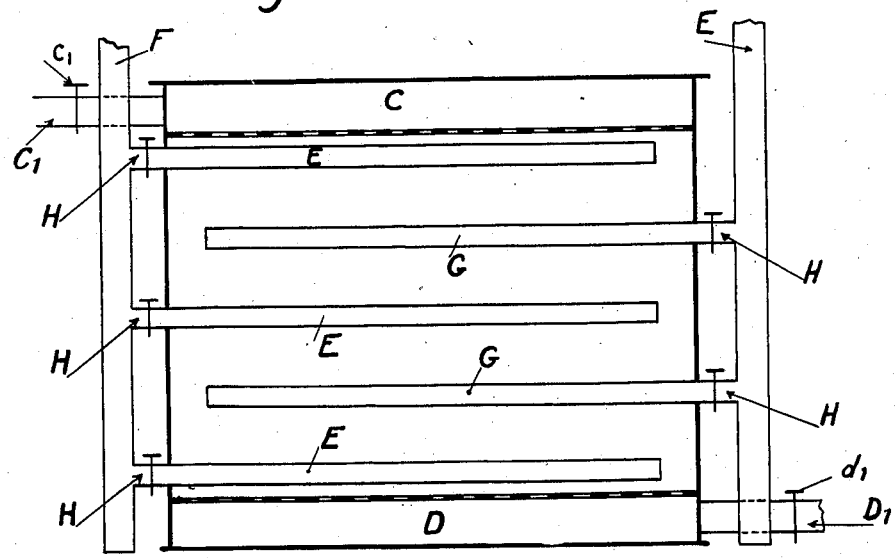

The apparatus comprises, like that of Figs. 1 to 3, a pipe $C_1$ for the admission of the gases to be treated and opening into a chamber C, as well as an outlet pipe $D_1$ for the treated gases and extending from a chamber D, these pipes being each provided with a cock ($c_1$, $d_1$ respectively Figs. 5 and 6).

The roses, instead of being entirely contained within the apparatus and extending from a trunk penetrating the mass, may, as shown by the modification illustrated, in sectional elevation in Fig. 6, extend from one or two external trunks (E—F), and cocks H may be provided, in such case, at the connection to each rose in order to interrupt the communication thereof with the respective trunk in the course of purifying or catalytic operations.

Figure 7:
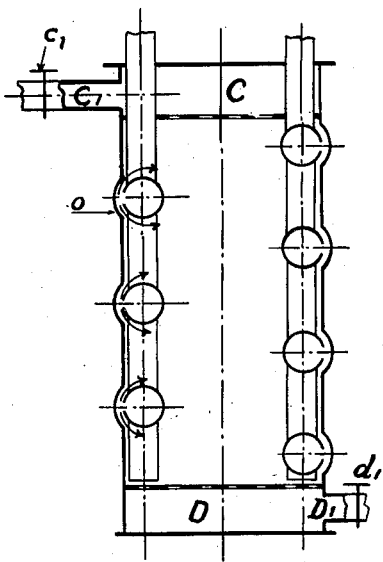

In the vertical longitudinal walls of the casings may be provided corrugations O of circular arc profile or divergent U-section, such as those shown in section in Fig. 7, and in which the horizontal roses are located, such corrugations constituting true deflectors for the gaseous stream issuing from the orifices of the said roses.

Figs. 8 and 9 illustrate by way of example, a construction embodying an improvement in the apparatus described above in connection with the figures already referred to, this improvement being particularly intended to be employed in combination with the construction illustrated in Fig. 3, although it may with advantage also be used in combination with the construction of Figs. 1 and 2.

The improvement illustrated in Figs. 8 and 9 consists, in principle, in the addition to the apparatus of Figs. 1 to 3 of a nest of tubes or an annular coil within the mass of catalytic or purifying agent, preferably in the zone which is located midway between the gas inlet roses and the outlet roses therefor, the said nest of tubes or coil serving, during the regeneration operations, for the circulation of a cooling agent such as air or other gas or even a liquid, the same nest or coil being capable of serving for the circulation of a gaseous or liquid heating agent, when the plant is set in operation.

Fig. 8 is a sectional elevation through the axis of the purifying or catalytic treatment operation.

Fig. 9 is a corresponding sectional plan along 9—9 of Fig. 8.

In these Figures 8 and 9: A denotes the reaction or purifying chamber, of annular configuration and comprising: on the one hand inlet roses E parallel with the axis of the apparatus, for the admission of the gaseous regenerating or reactivating agent, and distributed uniformly in the immediate vicinity of the wall or envelope of the said chamber; on the other hand outlet roses G for the gases resulting from the regeneration and distributed uniformly in the immediate vicinity of the enveloped wall.

A device for the circulation of a gaseous or liquid agent is located in the mass of purifying or catalytic agent with which the space between the grids $a_1$ and $a_2$ is charged. This device, which may be constituted by a nest of tubes opening into two trunks, one above and the other below, is, in the example of construction illustrated in Figs. 8 and 9, constituted by a coil H, located midway between the roses E and G.

In the course of the regenerating or reactivating operation, a stream of air or of liquid such as water is circulated at normal temperature by means of a pump, by admitting such cooling agent at the lower end $H_1$ of the said coil and taking off the heated agent which issues at $H_2$ to some part of the plant where it can be usefully employed.

The employment of such means of cooling, enables, without appreciably increasing the complication of the plant, the time necessary for regeneration to be appreciably reduced, the cooling no longer being effected exclusively by external and internal radiation through the walls of the reaction chamber, but also by radiation towards the interior of the additional pipe H, which therefore acts as a heat exchanger enabling the recuperation of at least a portion of the radiated heat.

The coil or other tubular device H for the circulation of a cooling agent, can as indicated above serve for the circulation of a heating agent when the plant is set in operation.

I claim:

1. The process of regenerating or reactivating a mass of catalytic or other solid contact material which comprises introducing an oxidizing-regenerating medium into the mass substantially simultaneously throughout the depth thereof by means of a plurality of inlets uniformly and symmetrically spaced in a series of parallel planes, passing the medium through the mass in parallel streams at a multiplicity of levels, and removing the products resulting from the passage of the regenerating medium through the mass by a plurality of outlets uniformly and symmetrically spaced in the same or adjacent parallel planes.

2. The process of regenerating or reactivating a mass of catalytic or other solid contact material which comprises introducing the regenerating medium into the mass substantially simultaneously throughout the depth thereof by means of a plurality of inlets uniformly and symmetrically spaced in a series of parallel planes, spreading the medium as it leaves said inlets, passing the spread medium through the mass in parallel converging streams at a multiplicity of levels, and removing the products resulting from the passage of the regenerating medium through the mass by a plurality of outlets uniformly and symmetrically spaced.

3. The process of regenerating or reactivating a mass of catalytic or other solid contact material which comprises introducing the regenerating medium into the mass substantially simultaneously throughout the depth thereof by means of a plurality of inlets uniformly and symmetrically spaced, passing the medium through the mass in parallel streams at a multiplicity of levels, removing the products resulting from the passage of the regenerating medium through the mass by a plurality of outlets uniformly and symmetrically spaced, and removing heat from the mass during the regenerating operation by conducting a fluid medium through the mass in heat exchange relation but out of direct contact therewith.

4. The process of regenerating or reactivating a mass of catalytic or other solid contact material which comprises introducing the regenerating medium into the mass substantially simultaneously throughout the depth thereof by means of a plurality of inlets uniformly and symmetrically spaced in a series of parallel planes, spreading the medium as it leaves said inlets, passing the spread medium through the mass in parallel converging streams at a multiplicity of levels, removing the products resulting from the passage of the regenerating medium through the mass by a plurality of outlets uniformly and symmetrically spaced, and removing heat from the mass in said planes at points intermediate said inlets and outlets by a gaseous or liquid medium in heat exchange relation with the mass.

5. In a catalytic converter, a reaction chamber inlet and outlet means for reactants and reaction products, a catalytic mass within said chamber, a plurality of inlet roses extending into said chamber in symmetrical arrangement and having perforations throughout their length for the admission of regenerating gases to said chamber, and outlet means for the fumes of regeneration also extending into said chamber in symmetrically disposed relation to said inlet roses.

6. In a catalytic converter, a reaction chamber having inlet and outlet means for reactants and reaction products, a contact mass within said chamber, and independent inlet and outlet means for regenerating gases comprising conduits perforated throughout their length extending into said chamber in parallelism with one another, said inlet and outlet conduits being symmetrically and uniformly spaced so that the action of the regenerating gases is effective simultaneously throughout the entire chamber.

7. In apparatus of the class described, a reaction chamber, a contact mass in said chamber, an annular series of inlet roses extending into said chamber in uniform and symmetrical arrangement, said roses having perforations throughout their length for the admission of regenerating gases to said chamber, and outlet means in parallel with said roses and within said annular series, said means providing outlets approximately coplanar with the perforations in said inlet roses.

8. In apparatus of the class described, a cylindrical reaction chamber, a contact mass in said chamber, an annular series of inlet roses extending into said chamber in uniform and symmetrical arrangement, said roses having perforations throughout their length for the admission of regenerating gases to said chamber, and a single outlet rose disposed in parallel with said inlet roses and centrally thereof and having perforations for the escape of fumes and gases resulting from the action of said regenerating gases.

9. In apparatus of the class described, a reaction chamber, a catalytic mass within said chamber, and a plurality of inlet roses uniformly distributed immediately adjacent the wall of said chamber so closely thereto that substantially none of the catalytic mass is retained between said roses and said wall, said roses having perforations therein only facing said wall for the admission of regenerating gases to said chamber whereby said wall forms a deflector for the incoming gases.

10. In apparatus of the class described, a reaction chamber, a catalytic mass within said chamber, a plurality of inlet roses uniformly distributed adjacent the wall of said chamber and having perforations therein only facing said wall for the admission of regenerating gases to said chamber, and means for deflecting the gases issuing from said perforations comprising corrugations formed in said wall facing said perforations.

11. In apparatus of the class described, a reaction chamber, a catalytic mass within said chamber, a plurality of outlet roses uniformly distributed adjacent the wall of said chamber and having perforations therein facing said wall for the removal of fluids from said chamber, and guiding means on said wall for directing fluids to said perforations.

12. In apparatus of the class described, an annular reaction chamber, a catalytic mass within said chamber, a plurality of inlet roses uniformly distributed about the periphery of the outer wall of said chamber and having perforations therein only facing said wall for the admission of regenerating gases to said chamber, and a plurality of outlet roses symmetrically disposed with respect to said inlet roses and uniformly distributed about the periphery of the inner wall of said chamber for exhausting the products of regeneration therefrom.

13. In apparatus of the class described, an annular reaction chamber, a catalytic mass therein, and a plurality of inlet and outlet roses symmetrically disposed about the peripheries of opposite walls of said chamber for supplying regenerating gases to and exhausting the products of regeneration from said chamber, the perforations formed in said inlet and outlet roses all facing the adjacent walls.

14. In apparatus of the class described, a reaction chamber for containing a contact mass, a plurality of inlet and outlet roses symmetrically disposed adjacent opposite walls of said chamber for supplying a regenerating medium to and exhausting the products of regeneration from said chamber, said roses having perforations facing the adjacent walls, and guiding means on said walls for directing fluids from said perforations in said inlet roses to said perforations in said outlet roses.

15. In apparatus of the class described, a reaction chamber, a catalytic mass therein, a plurality of inlet roses uniformly distributed adjacent the wall of said chamber for supplying regenerating gases thereto, corrugations formed in said wall in which said inlet roses are located, the perforations in said roses all facing said corrugations, and a plurality of outlet roses symmetrically disposed with respect to said inlet roses for exhausting the products of regeneration from said chamber.

16. In apparatus of the class described, a reaction chamber rectangular in horizontal and vertical cross section, a catalytic mass therein, a plurality of inlet roses uniformly distributed adjacent one of the longitudinal vertical walls of said casing and comprising horizontal branches extending from a central vertical trunk, the perforations in said inlet roses all facing said wall, and a plurality of outlet roses uniformly distributed adjacent the opposite longitudinal vertical wall of said casing and symmetrically disposed with respect to said inlet roses, said outlet roses also comprising horizontal branches extending from a central vertical trunk.

17. In apparatus of the class described, a reaction chamber, a catalytic mass therein, a plurality of inlet and outlet roses symmetrically disposed adjacent opposite walls of said chamber for supplying regenerating gases to and exhausting the products of regeneration from said chamber, and means embedded in said catalytic mass intermediate said opposite walls for the circulation therein of a heat exchanging medium.

18. In apparatus for effecting chemical reactions, a reaction chamber for containing a contact mass, a plurality of inlet roses extending into said chamber in symmetrical arrangement and having perforations throughout their length for the admission of reactant gases to said chamber, outlet means also extending into said chamber in parallel with said roses and providing a multiplicity of outlets for the products of the reaction, and means in said chamber intermediate said inlet roses and said outlet means and substantially coextensive therewith for the circulation of a heat exchanging medium.

19. In apparatus for effecting chemical reactions, a cylindrical reaction chamber, a contact mass in said chamber, an annular series of inlet roses extending into said chamber in uniform and symmetrical arrangement, said roses having perforations throughout their length for the admission of reactant fluids to said chamber, outlet means in parallel with said roses and within said annular series providing a multiplicity of outlets for the products of the reaction, and heat exchange means embedded in said mass and within said annular series of inlet roses.

20. In apparatus for effecting chemical reactions, a reaction chamber for containing a contact mass, independent inlet and outlet means for regenerating gases comprising conduits perforated throughout their length extending into said chamber in parallelism with one another, said inlet and outlet conduits being symmetrically and uniformly spaced so that the action of the regenerating gases is effective simultaneously throughout the entire chamber, and tubular means in said chamber intermediate said inlet and outlet conduits for conducting a liquid or gaseous heat exchange medium.

21. In apparatus for effecting chemical reactions, a cylindrical reaction chamber for containing a contact mass, an annular series of inlet roses extending into said chamber in uniform and symmetrical arrangement, said roses having perforations throughout their length for the admission of reactant fluids to said chamber, a single outlet rose disposed in parallel with said inlet roses and centrally thereof and having perforations for the escape of the products of the reaction, and tubular means mounted in said chamber between said inlet and outlet roses for bringing a gaseous or liquid medium into heat exchange relation with the contact mass.

22. In apparatus of the class described, a reaction chamber, a catalytic mass therein, a plurality of inlet roses uniformly distributed adjacent one wall of said chamber for supplying regenerating gases thereto, a plurality of outlet roses in parallelism with said inlet roses and uniformly distributed adjacent an opposite wall of said chamber, all of said roses having perforations the length thereof to effect movement of the regenerating gases from said inlet roses in parallelism at a multiplicity of levels through said contact mass to said outlet roses, and means embedded in said mass between said inlet and said outlet roses for effecting heat exchange between said mass and a gaseous or liquid medium.

23. In apparatus of the type adapted for the treatment of gases in the presence of catalytic agents and for the regeneration of said agents, a reaction chamber having a pair of spaced grids therein, a catalytic mass between said grids, means for supplying a gas to be catalyzed to said chamber between one of said grids and the adjacent end of said chamber, means for exhausting the reaction products from said chamber between the other of said grids and the adjacent end of said chamber, a nest of inlet roses uniformly distributed within said catalytic mass adjacent the wall of said chamber and having a plurality of perforations spaced along their lengths for the admission to said chamber of regenerating gases, and an outlet rose symmetrically located with respect to said inlet roses for exhausting the products resulting from regeneration, said outlet rose having perforations approximately coplanar with corresponding perforations in said inlet roses whereby the action of the regenerating gases is effective substantially simultaneously throughout the entire length of the chamber along a series of sections corresponding to the cooperating inlet and outlet perforations.

24. In apparatus of the type adapted for the treatment of gases in the presence of catalytic agents and for the regeneration of said agents, an annular reaction chamber having a pair of spaced grids therein, a catalytic mass between said grids, means for supplying a gas to be catalyzed to said chamber between one of said grids and the adjacent end of said chamber, means for exhausting the reaction products from said chamber between the other of said grids and the adjacent end of said chamber, a nest of inlet roses uniformly distributed within said catalytic mass about the periphery of one of the walls of said chamber and having a plurality of perforations spaced along their lengths for the admission to said chamber of regenerating gases, and a plurality of outlet roses symmetrically located with respect to said inlet roses and uniformly distributed about the periphery of the other wall of said chamber for exhausting the products resulting from regeneration, said outlet roses having perforations corresponding to those in said inlet roses, all of said perforations facing the adjacent wall.

25. In apparatus of the type adapted for the treatment of fluids in the presence of catalytic masses and for the regeneration of said masses, a converter having a pair of spaced grids therein dividing the interior of the converter into a central reaction chamber and two end chambers, a catalytic mass in the reaction chamber between said grids, means for supplying fluid to be catalyzed to one end chamber, means for removing reaction products from the other of said end chambers, a nest of inlet roses extending into said reaction chamber between said grids and uniformly distributed in a circle, said inlet roses having a plurality of perforations spaced along their lengths for the admission to said mass of a regenerating medium, and an outlet rose disposed at the center of said nest of inlet roses and having perforations substantially at the levels of the perforations in said inlet roses for removing from said mass the products resulting from regeneration.

ALFRED JOSEPH.